(12) United States Patent
Havinis

(10) Patent No.: US 6,219,557 B1
(45) Date of Patent: *Apr. 17, 2001

(54) SYSTEM AND METHOD FOR PROVIDING LOCATION SERVICES IN PARALLEL TO EXISTING SERVICES IN GENERAL PACKET RADIO SERVICES ARCHITECTURE

(75) Inventor: Theodore Havinis, Plano, TX (US)

(73) Assignee: Ericsson Inc., Research Triangle Park., NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/210,155

(22) Filed: Dec. 11, 1998

(51) Int. Cl.[7] .................................................. H04Q 7/20
(52) U.S. Cl. .......................... 455/456; 455/414; 455/432; 455/466; 455/517; 455/560
(58) Field of Search .................................. 455/456, 455, 455/426, 432, 560, 414, 466, 517

(56) References Cited

U.S. PATENT DOCUMENTS

| | | | |
|---|---|---|---|
| 5,475,689 | * | 12/1995 | Kay et al. ............................ 370/95.3 |
| 5,666,348 | * | 9/1997 | Thornberg et al. ................... 370/230 |
| 5,828,959 | * | 10/1998 | Soderbacka .......................... 455/445 |
| 5,850,444 | * | 12/1998 | Rune ...................................... 380/21 |
| 5,862,481 | * | 1/1999 | Kulkarni et al. ...................... 455/432 |
| 5,901,352 | * | 5/1999 | St-Pierre et al. ...................... 455/426 |
| 6,018,657 | * | 1/2000 | Kennedy, III et al. ............... 455/426 |
| 6,038,439 | * | 3/2000 | Rune ....................................... 455/406 |
| 6,052,589 | * | 4/2000 | Persson et al. ........................ 455/433 |
| 6,104,931 | * | 8/2000 | Havinis et al. ........................ 455/456 |
| 6,104,932 | * | 8/2000 | Havinis ................................. 455/456 |

* cited by examiner

Primary Examiner—Curtis Kuntz
Assistant Examiner—Barry W. Taylor
(74) Attorney, Agent, or Firm—Jenkins & Gilchrist, P.C.

(57) ABSTRACT

A telecommunications system and method is disclosed for enabling a General Packet Radio Service (GPRS) node, namely a Serving GPRS Support Node (SGSN) within a cellular network, to be able to handle requests for Location Services (LCS) for a GPRS mobile station (MS) in parallel to other existing transactions such as delivering short messages or engaging in session management activity, e.g., data call connection. A new LCS transaction type can be introduced in the Connection-Management (CM) sub-layer of GPRS in the SGSN and the GPRS MSs to handle requests for LCS in parallel to other offered services. LCS can be multiplexed together with other existing functions in GPRS by allocating a new Service Access Point Identifier (SAPI) to LCS within the Logical Link Control (LLC) sub-layer of the GPRS. Alternatively, when a common LLC SAPI is used between different CM-sublayer functions, then a different protocol discriminator (PD) can be allocated for LCS.

18 Claims, 6 Drawing Sheets

SYSTEM AND METHOD FOR PROVIDING LOCATION SERVICES IN PARALLEL TO EXISTING SERVICES IN GENERAL PACKET RADIO SERVICES ARCHITECTURE

BACKGROUND OF THE PRESENT INVENTION

1. Field of the Invention

The present invention relates generally to telecommunications systems and methods for positioning a mobile station within a cellular network, and specifically to offering location services in parallel to other existing services for mobile stations capable of handling data communications.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
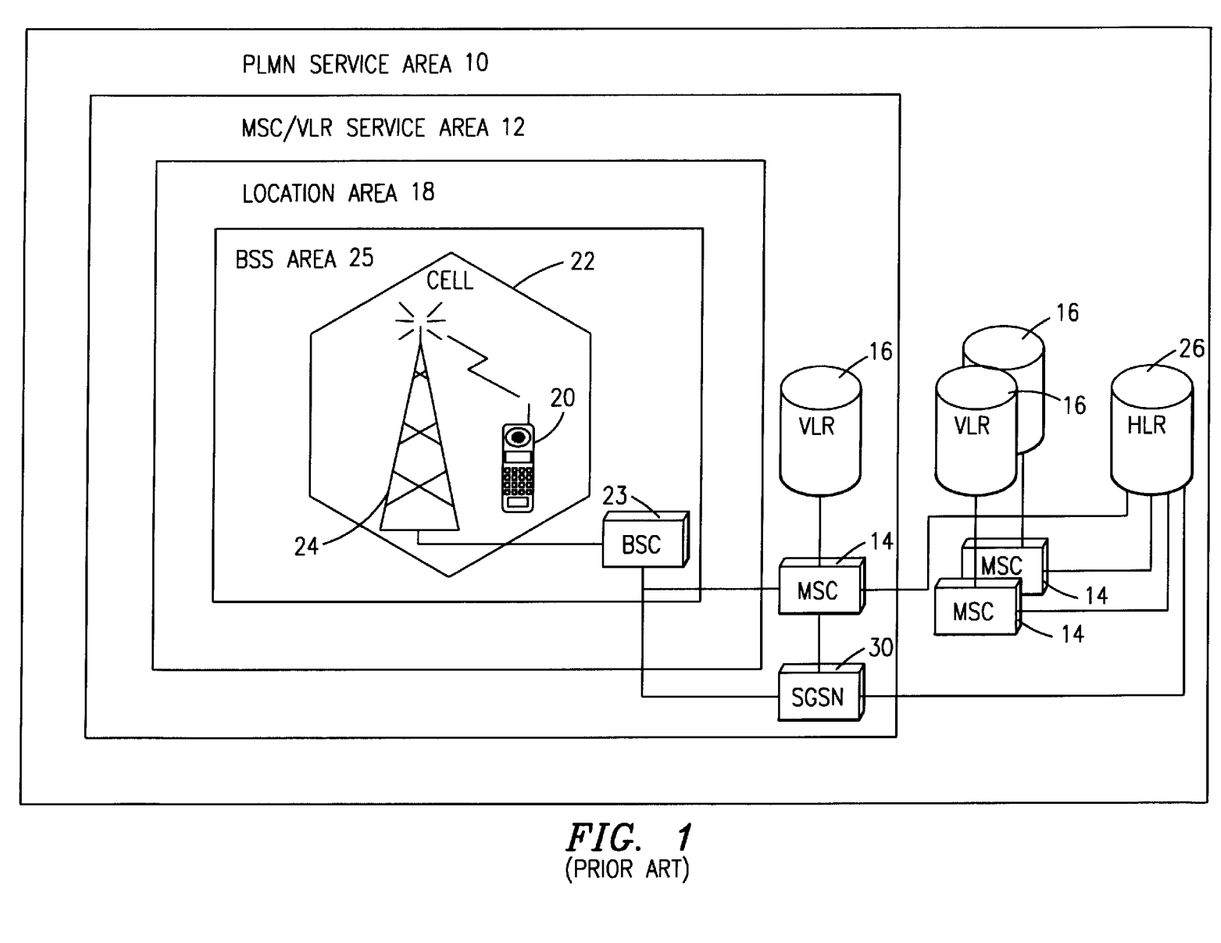
FIG. 1 is a block diagram of a conventional wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between the MS 20 and the PLMN 10. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

A Serving General Packet Radio Service Support Node (SGSN) 30, which is part of the General Packet Radio Service (GPRS) architecture, connects with the MSC 14 to provide packet switching of high and low speed data and signaling in an efficient manner to and from the MS 20. When the MS 20 is engaged in a data call, e.g., the MS 20 has an Internet connection (not shown) for sending and receiving data, data is sent from the MS 20 to the SGSN 30. The SGSN 30 provides a packet-switched connection for the data. Received data is transmitted from the SGSN 30 to the MS 20.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

Circuit switched paging and identification of the MS 20 when the MS 20 is both IMSI and GPRS attached, e.g., registered with both the VLR 16 and the GPRS 30, is performed via the SGSN 30 instead of the MSC 14, due to the higher efficiency and capacity offered by the SGSN 30 as compared with the MSC 14. For similar reasons, it is more efficient to locate an MS 20 that is both IMSI and GPRS attached via the SGSN 30 rather than the MSC 14.

Figure 2:
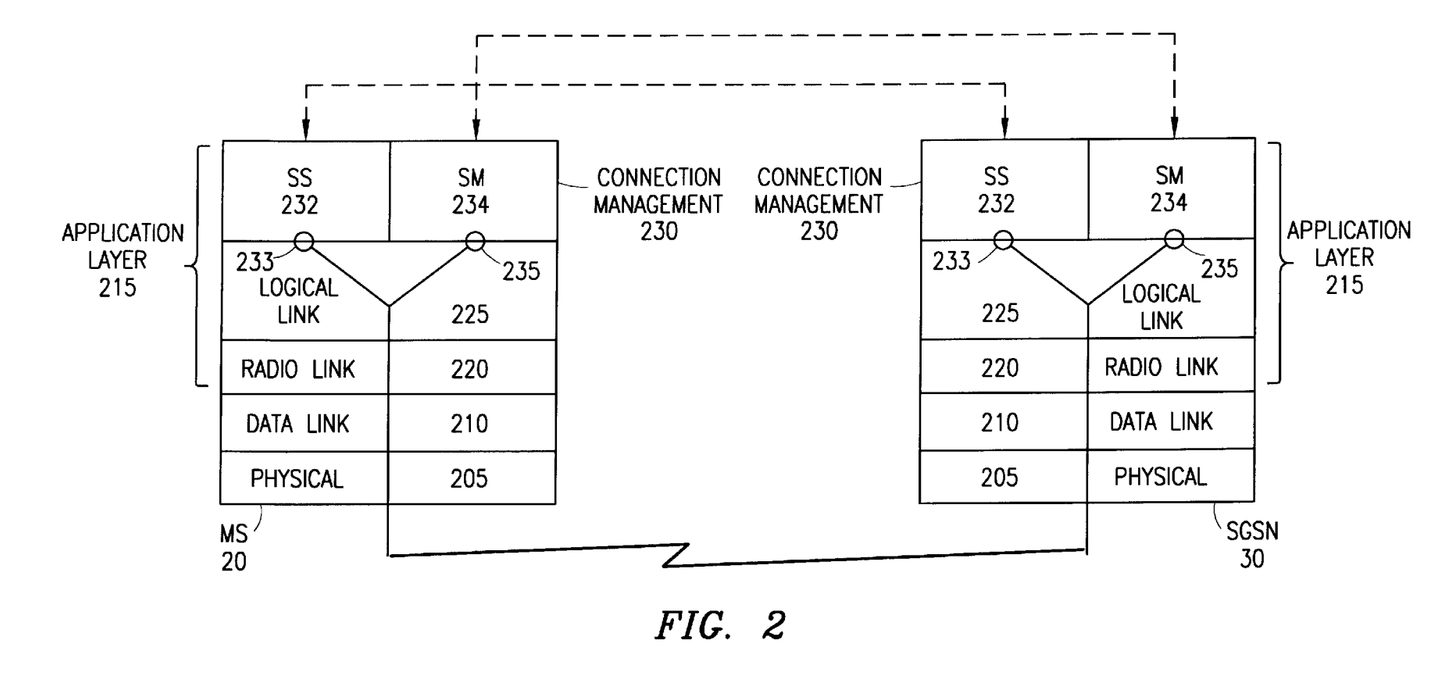
FIG. 2 describes the connection between a mobile station and a Serving General Packet Radio Service Support Node as several functional layers arranged in hierarchical form in accordance with OSI standards.

Currently, when an MS 20, which is registered with the SGSN 30, is being positioned, the MS 20 is not always able to make or receive data calls or send or receive short messages. With reference now to FIG. 2 of the drawings, using the Open Systems Interconnection (OSI) model, which was developed by the International Standards Organization (ISO) in 1982, the inability of the MS 20 to engage in other activities involving the SGSN 30 while being positioned can be explained by describing the connection between the MS 20 and the SGSN 30 as several functional layers arranged in hierarchical form. These consist of the physical layer 205, the data link layer 210 and the application layer 215, which are on both the SGSN 30 and the MS 20. The application layer 215 is composed of three sublayers: a Radio Link Control (RLC) sublayer 220, a Logical Link Control (LLC) sub-layer 225 and a Connection Management (CM) sub-layer 230, which is the highest sub-layer within the application layer 215.

The CM protocol 235 controls two separate transaction types: session management (SS layer) 232, which handles data call delivery, such as activating, modifying and deleting the contents of packet data protocols, and short message handling delivery (SM layer) 234, which handles the delivery of Short Message Service (SMS) messages. Each transaction type 232 and 234 can be allocated a separate Service Access Point Identifier (SAPI) 233 and 235, respectively, within the LLC sub-layer 225 for distinguishing between the transaction types 232 and 234. Alternatively, when a common LLC SAPI is used between different transaction types 232 and 234, it is possible for a mobile subscriber to establish two CM-connections 230, using the same LLC-connection 220, by using different protocol discriminators (PDs) (not shown) to distinguish between the transaction types. Therefore, it is possible to provide SMS and data call services at one time and to change between the different services if necessary.

Any transaction may be established in parallel to any combination of other transactions. However, for a given RLC-connection 220, LLC-connections 230 can only be established once for each of the transaction types 232 and 234. Thus, only one LLC-connection 230 is allowed at a time per transaction type 232 and 234. That implies that, if LCS were to be defined as part of either the SS layer 232 or SM layer 234, it would be impossible to offer an LCS transaction at the same time as another transaction if both transactions belonged to the same transaction type (SS 232 or SM 234).

It is, therefore, an object of the present invention to allow LCS transactions to be performed in parallel to other existing transactions such as data calls or short messages within a GPRS architecture.

SUMMARY OF THE INVENTION

The present invention is directed to telecommunications systems and methods for enabling a General Packet Radio Service (GPRS) node, namely a Serving GPRS Support Node (SGSN) within a cellular network, to be able to handle requests for Location Services (LCS) for a GPRS mobile station (MS) in parallel to other existing transactions such as delivering short messages or engaging in session management activity, e.g., data call connection. A new LCS transaction type can be introduced in the Connection-Management (CM) sub-layer of GPRS in the SGSN and the GPRS MSs to handle requests for LCS in parallel to other offered services. LCS can be multiplexed together with other existing functions in GPRS by allocating a new Service Access Point Identifier (SAPI) to LCS within the Logical Link Control (LLC) sub-layer of the GPRS in the SGSN and the GPRS MSs in order to support LCS services in parallel to other transaction types. Alternatively, when a common LLC SAPI is used between different CM-sublayer functions, then a different protocol discriminator (PD) must be allocated for LCS in order to be able to handle LCS transactions in parallel to other transactions.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3A:
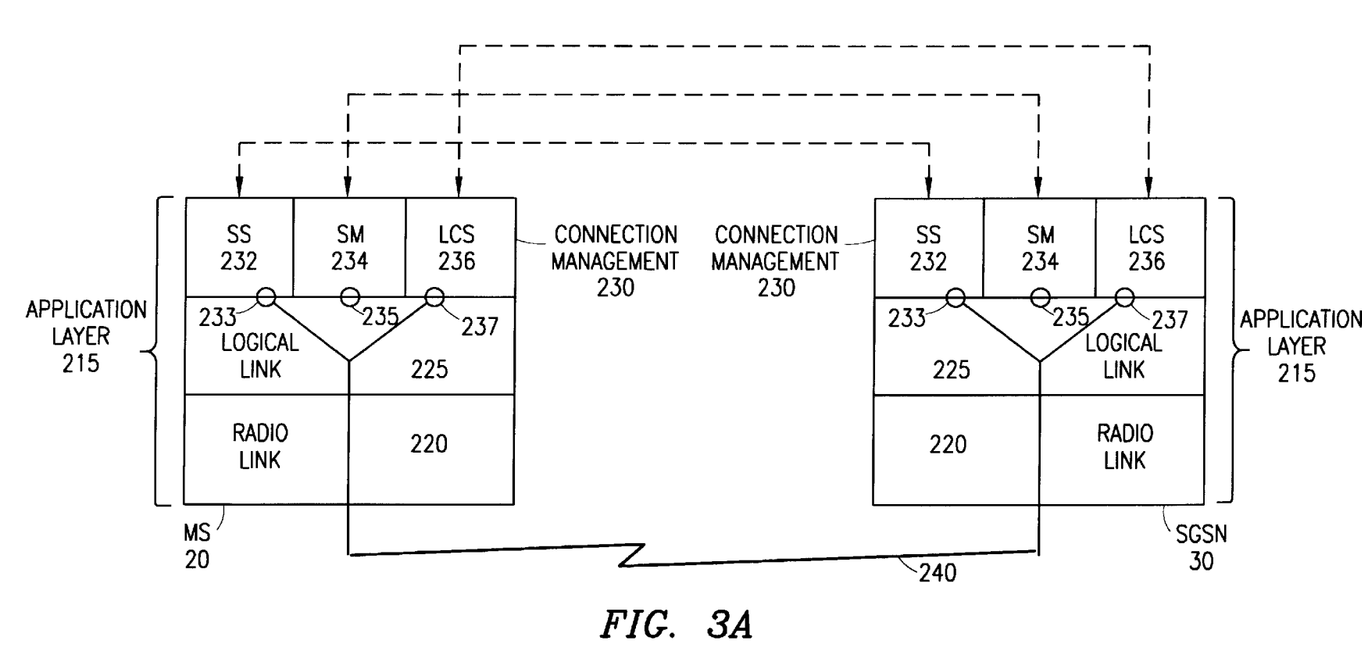
FIG. 3 illustrates the implementation of a new LCS transaction type in the CM-sublayer in accordance with preferred embodiments of the present invention.
Figure 3B:
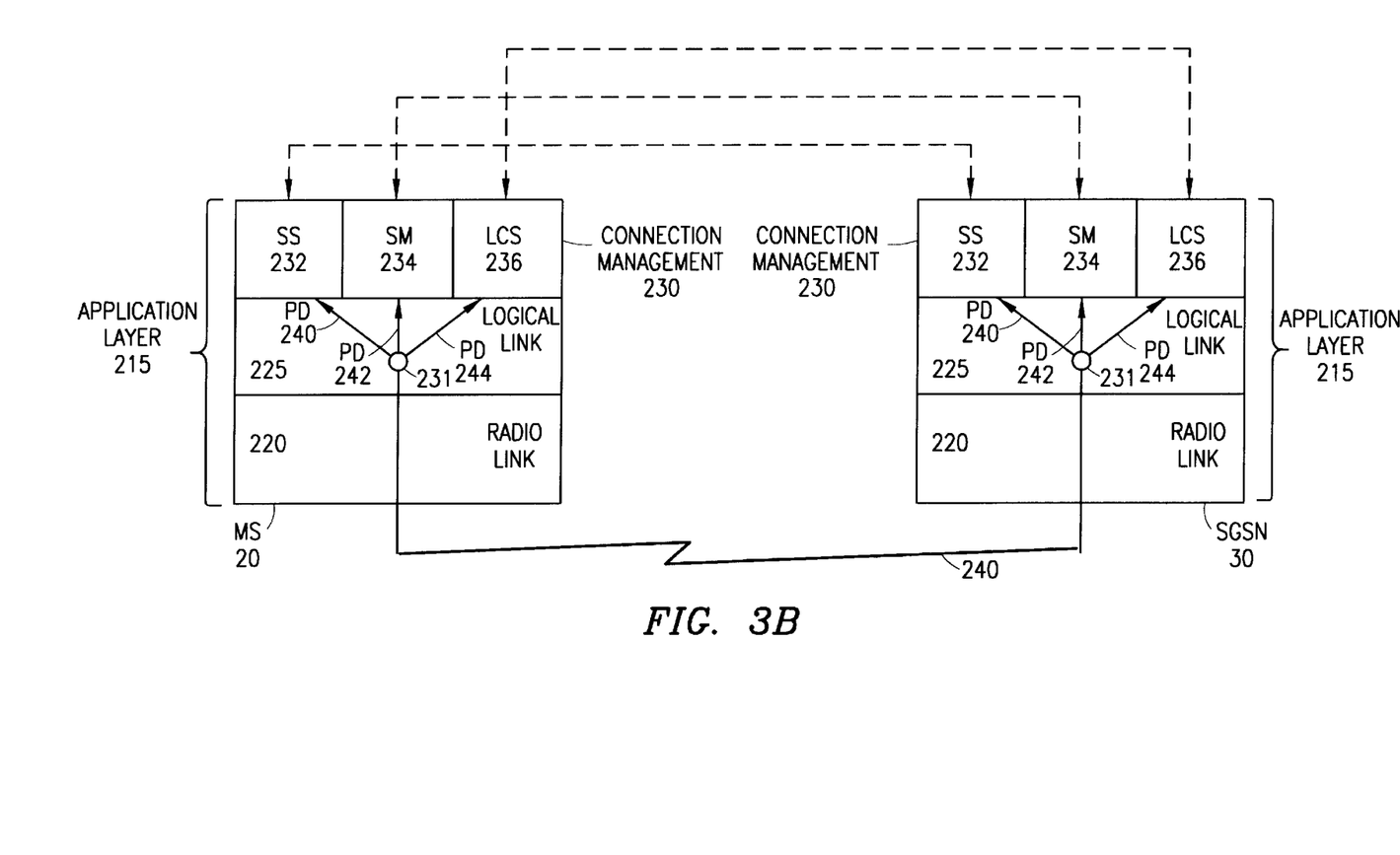

With reference now to FIGS. 3A and 3B of the drawings, in order to overcome the architectural restraint within the General Packet Radio Service (GPRS) architecture on initiating both Location Services (LCS) and either a call short message, or a data call in parallel, a new type of layer called LCS 236 can be defined on the connection management (CM) sublayer level 230 of the application layer 215 within a GPRS mobile station (MS) 20 and a Serving GPRS Support Node (SGSN) 30. The LCS layer 236 or transaction type will be in parallel with a session management (SS) sub-layer 232 and a short message (SM) sub-layer 234. Therefore, an LCS transaction 236 can be performed in parallel to any other existing transaction for the same mobile subscriber at any one time.

As between the MS 20 and the SGSN 30, the MS 20 can establish several Logical Link Control (LLC)-connections 225 with the SGSN 30, using the same Radio Link Control (RLC)-connection 220, which is the layer responsible for converting the digital data into bit streams for transmission across the air interface 240. Therefore, it is possible to provide several telecommunication services at one time and to change between different services if necessary. Any transaction may be established in parallel to any combination of other transactions. However, for a given RLC-connection 220, only one LLC-connections 225 can be established for each of the transaction types 232, 234 and 236. Thus, only one LLC-connection 225 is allowed at a time per subscriber per transaction type 232, 234 and 236.

The MS 20 can establish such an LLC-connection 225 by the MS 20 transaction type layer, e.g., LCS 236, sending the request through it's LLC 225 and RLC 220 layers to establish an LLC-connection 225 with the LCS layer 236 on the SGSN 30. The request is sent over the RLC-connection 220 between the MS 20 and the SGSN 30 using DTAP signaling. If, on the other hand, a transaction type layer 232, 234 or 236 on the SGSN 30 would like to establish an LLC-connection 225 with the associated transaction type layer 232, 234, or 236, respectively, of the MS 20, the process is reversed.

As shown in FIG. 3A of the drawings, the LLC-connection 225 can be established by allocating a separate Service Access Point Identifier (SAPI) 233,235 or 237 within the LLC sub-layer 225 for each transaction type layer 232, 234 or 236, respectively, in order to distinguish between the transaction types 232, 234 and 236. Alternatively, as shown in FIG. 3B of the drawings, when a common LLC SAPI 231 is used between different transaction types 232, 234 and 236, the LLC-connection 225 is established by using different protocol discriminators (PDs) 240, 242 and 244 to distinguish between the transaction types 232, 234 and 236, respectively.

Figure 4:
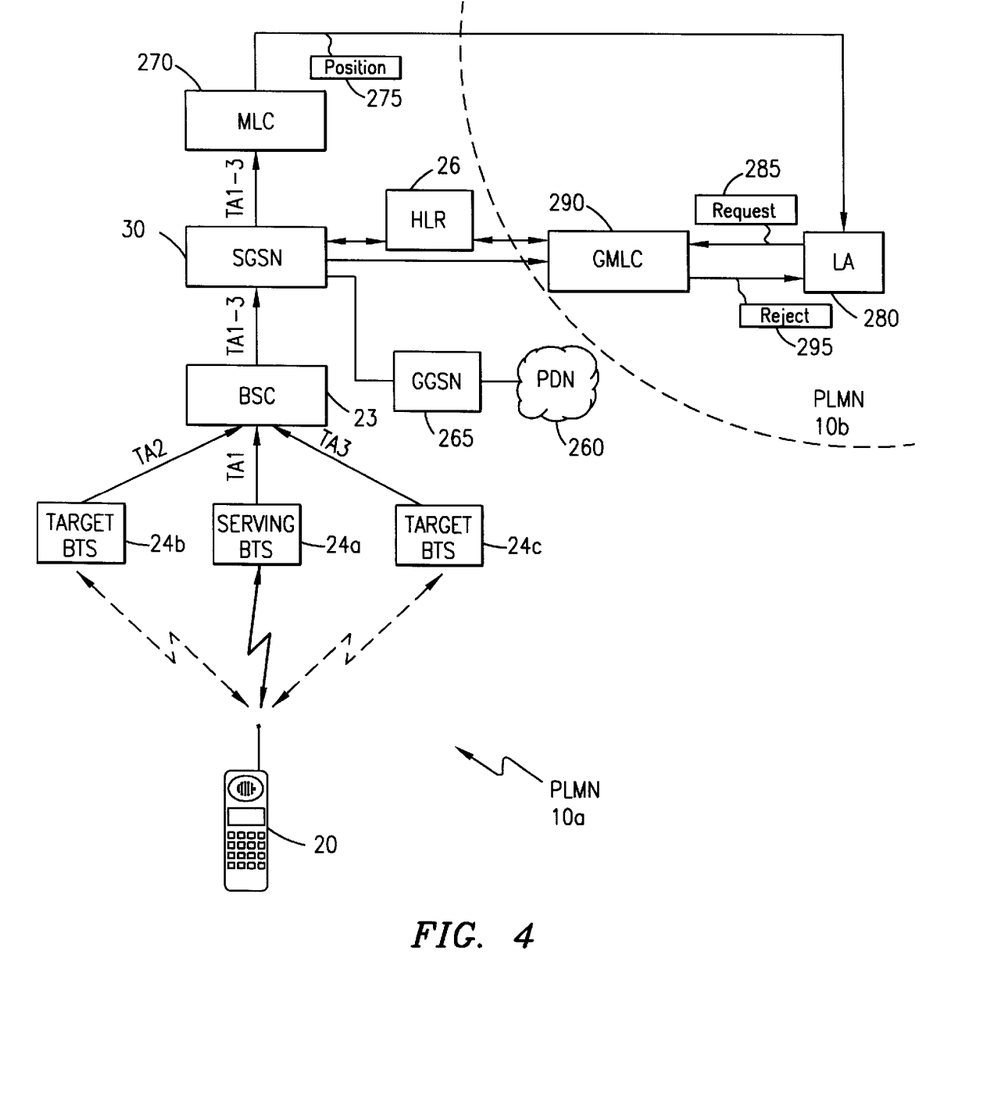
FIG. 4 shows the simultaneous positioning of a mobile station and delivery of a short message to that mobile terminal using embodiments of the present invention.

With the new LCS layer 236, when a positioning request for a particular MS 20 that is GPRS attached, e.g., registered with a SGSN 30, is received by the SGSN 30, positioning of that MS 20 can be performed regardless of whether the MS 20 is currently engaged in a data call or is receiving or sending a short message. For example, as can be seen in FIG. 4 of the drawings, which will be described in connection with the steps listed in FIG. 5 of the drawings, positioning of a particular MS 20 typically begins by a requesting Location Application (LA) 280 sending a positioning request 285, which specifies the particular Mobile Station International Subscriber Identity Number(s) (MSISDN) associated with the particular MS 20 to be positioned, to a Gateway Mobile Location Center (GMLC) 290 within the Public Land Mobile Network (PLMN) 10b of the LA 280 (step 500).

Figure 5:
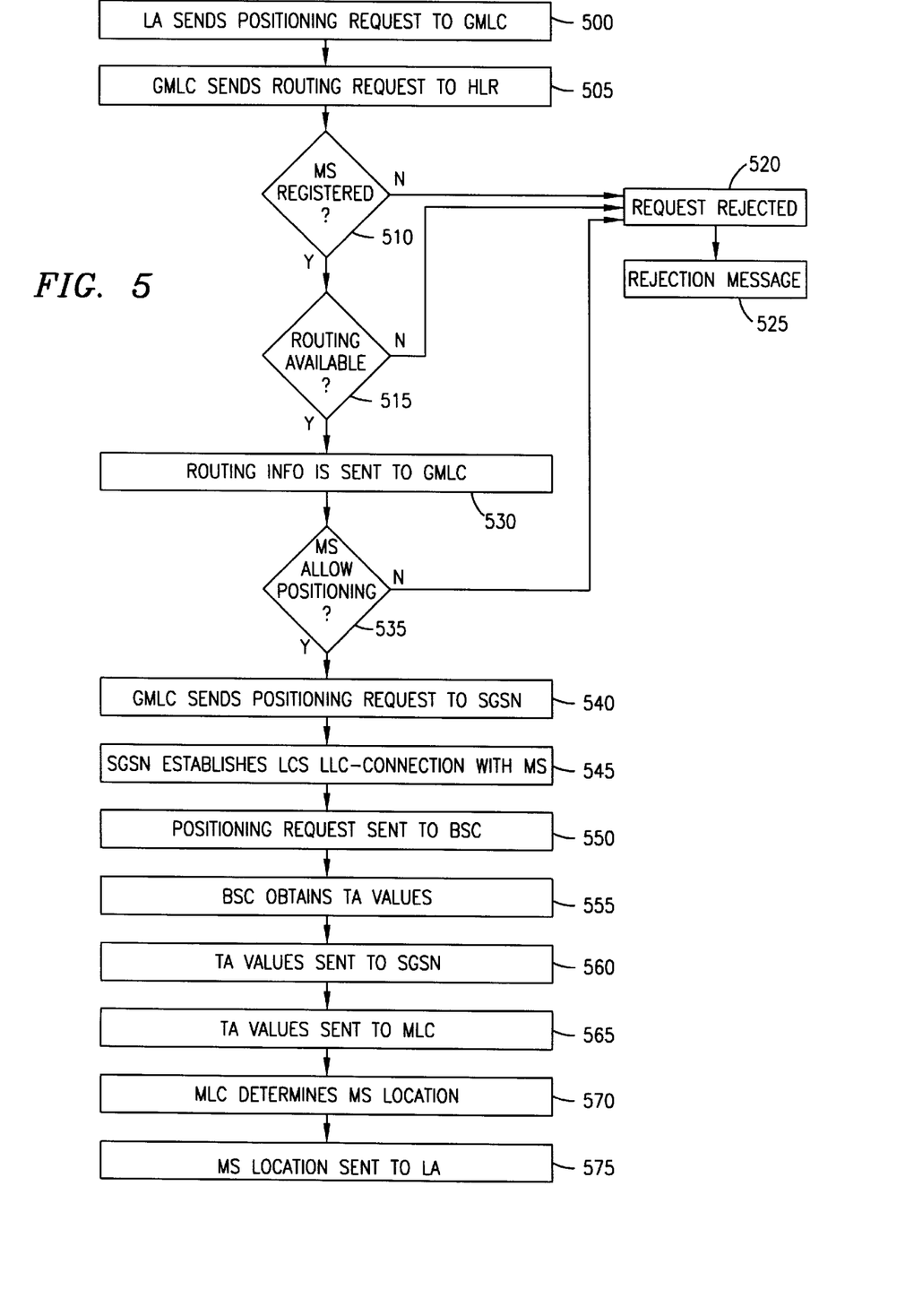
FIG. 5 shows steps in implementing the process illustrated in FIG. 4.

When the GMLC 290 receives the positioning request 285 (step 500), the GMLC 290 sends a request for routing information (step 505), e.g., the address of the SGSN 30 serving the PLMN 10a that the MS 20 is currently located in and positioning subscription information for the MS 20, to the MS's Home Location Register (HLR) 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 510), and that routing information for that MS 20 is available (step 515). If the MS 20 is not registered in the HLR 26 (step 510) or the routing information is not available (step 515), the routing information request is rejected by the HLR 26 (step 520) and the GMLC 290 sends a rejection message 295 to the requesting LA 280 (step 525). However, if the MS 20 is registered in the HLR 26 (step 510) and routing information for the SGSN 30 is available (step 515), the routing information, e.g., the SGSN 30 address, together with the positioning subscription information, is sent to the GMLC 290 (step 530).

The GMLC 290 verifies that the MS 20 allows positioning to be performed (step 535), e.g., by checking the positioning subscription information, sent by the HLR 26, and if the MS 400 does not allow positioning (step 535), the positioning request 285 is rejected (step 520) and a rejection message 295 is sent to the LA 280 (step 525). However, if the MS 20 does allow positioning (step 535), the GMLC 290 can send the positioning request 285 to the SGSN 30 (step 540) to perform positioning of the MS 20.

Normally, at this point, if the SGSN 30 determines that the MS 20 has established a data call connection or is receiving or sending a short message, the positioning request 285 would be rejected. However, with the new LCS layer 236 shown in FIGS. 3A and 3B, if, for example, the MS 20 is engaged in a data call connection over the Public Data Network (PDN) 260, which can be, for example, the Internet, via a Gateway General Packet Radio Service Node (GGSN) 265, the SGSN 30 can allow the positioning to occur by establishing an LCS 236 LLC-connection 225 between the SGSN 30 and the MS 20 to be positioned (step 545) in addition to the SS 232 LLC-connection 225 between the SGSN 30 and the MS 20 using either separate PD's 244 and 243, respectively or separate SAPI's 237 and 233, respectively.

In order to complete the positioning process, the SGSN 30 can forward the positioning request 285 to a Base Station Controller (BSC) 23 (step 550) serving the MS 20. It should be noted that if the MS 20 is not engaged in a call connection, e.g., the MS 20 is in idle mode, the SGSN 30 must first page the MS 20 prior to forwarding the positioning request 285 to the BSC 23 (step 550).

The originating BSC 23 then determines which Base Transceiver Station (BTS) 24a is currently serving the MS 20, and obtains a Timing Advance (TA) value (TA1 ), or other positioning data, from this serving BTS 24a, if possible. TA values corresponds to the amount of time in advance that the MS 20 must send a message in order for the BTS 24a to receive it in the time slot allocated to that MS 20. When a message is sent from the MS 20 to the BTS 24a, there is a propagation delay, which depends upon the distance between the MS 20 and the BTS 24a. TA values are expressed in bit periods, and can range from 0 to 63, with each bit period corresponding to approximately 550 meters between the MS 20 and the BTS 24a.

Thereafter, TA values are obtained from at least two target BTSs (24b and 24c) (step 555) by performing a positioning handover. If the serving BTS 24a does not support positioning, an additional target BTS (not shown) must be selected. It should be noted that positioning of the MS 20 can be performed using more than three BTSs (24a, 24b, and 24c).

The TA values (TA1, TA2 and TA3) measured by the BTS's (24a, 24b and 24c) are then transmitted by the serving BSC 23 to the SGSN 30 (step 560). Finally, the TA values (TA1, TA2 and TA3) and the positioning request 285 are forwarded to a serving Mobile Location Center (MLC) 270 from the SGSN 30 (step 565), where the location of the MS 20 is determined using a triangulation algorithm (step 570). The MLC 270 then presents positioning information 275 representing the geographical position of the MS 20 to the requesting LA (node) 280 (step 575) without interrupting the data call connection between the positioned MS 20 and the Internet 260.

It should be understood, however, that any estimate of time, distance, or angle for any cellular system can be used, instead of the TA value method discussed herein. For example, the MS 20 can have a Global Positioning System (GPS) receiver built into it, which can be used to determine the location of the MS 20. In addition, the MS 20 can collect positioning data based on the Observed Time Difference (OTD) between the time a BTS 24 sends out a signal and the time the MS 20 receives the signal. This time difference information can be sent to the MLC 270 for calculation of the location of the MS 20. Alternatively, the MS 20, with knowledge of the location of the BTS 24, can determine its location and forward it to the MLC 270.

In addition to providing a layer for Location Service features, the new LCS layer 236 in FIGS. 3A and 3B, which is defined on the CM-sublayer level 230 can be used as a generic layer in the CM-sublayer 230 to cater for any network 10 and/or MS 20 feature not belonging to any existing layer 232 or 234 in the CM-sublayer 230. A generic SAPI 237 or generic PD 244 can be used to distinguish the generic 236 sub-layer from the SS 232 and SM 234 sublayers. However, in this case, if the LCS layer 236 is used for another feature for a particular subscriber, positioning of that subscriber at the same time would not be possible.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for allowing location services to be offered in parallel to existing services within a General Packet Radio Service (GPRS) system, said telecommunications system comprising:

a serving GPRS support node in wireless communication with a mobile station, said serving GPRS support node receiving a positioning request for said mobile station;

a connection management sublayer within said serving GPRS node and said mobile station, said connection management sublayer supporting a location service transaction type and at least one additional transaction type therein; and a logical link control sublayer within said serving GPRS support node and said mobile station, said serving GPRS support node establishing a connection between said location service transaction type of said serving GPRS support node and said location service transaction type of said mobile station, using said logical link control sublayer, to perform said positioning request.

2. The telecommunications system of claim 1, further comprising a radio link control sub-layer within said serving GPRS support node and said mobile station, the connection between said logical link control sublayers of said location service transaction types of said serving GPRS support node and said mobile station being established using said respective radio link control sublayers.

3. The telecommunications system of claim 2, further comprising a physical layer, a data link layer and an application layer within said serving GPRS support node and said mobile station, said radio link control sublayer, said connection management sublayer and said logical link control sublayer residing in said application layer.

4. The telecommunications system of claim 1, wherein said at least one additional transaction type includes at least one of: a session management transaction type and a short message transaction type.

5. The telecommunications system of claim 1, wherein said mobile station and said serving GPRS support node also has an additional logical link control connection between said respective at least one additional transaction types, wherein services represented by said location service transaction type and said at least one additional transaction type are offered in parallel without disrupting each other.

6. The telecommunications system of claim 5, wherein said logical link control layer within said mobile station and said serving GPRS support node comprise a location service Service Access Point Identifier for establishing said logical link control connection between said respective location service transaction types of said mobile station and said serving GPRS support node and an additional Service Access Point Identifier for establishing said additional logical link control connection between said respective at least one additional transaction types of said mobile station and said serving GPRS support node.

7. The telecommunications system of claim 5, wherein said location service transaction type has a first protocol discriminator associated therewith for establishing said logical link control connection between said respective location service transaction types of said mobile station and said serving GPRS support node, said at least one additional transaction type having a second protocol discriminator associated therewith for establishing said additional logical link control connection between said respective at least one additional transaction types of said mobile station and said serving GPRS support node.

8. The telecommunications system of claim 1, wherein said at least one additional transaction type is a session management transaction type, said mobile station and said serving GPRS support node having an additional logical link control connection between said respective session management transaction types in order to establish a data call for said mobile station, said logical link control connection between said respective location service transaction types of said serving GPRS support node and said mobile station being established without disrupting said data call.

9. The telecommunications system of claim 1, wherein said at least one additional transaction type includes a session management transaction type and a short message transaction type, said location service transaction type supporting location services and additional services not supported by said session management transaction type or said short message transaction type.

10. A telecommunications system for providing location services in parallel to session management and short message services within a General Packet Radio Service (GPRS) system, said telecommunications system comprising:

a radio link control sublayer within a mobile station and a serving GPRS support node in wireless communication with said mobile station, said radio link control sublayer transmitting data between said serving GPRS support node and said mobile station;

a connection management sublayer within said serving GPRS support node and said mobile station, said connection management sublayer having a session management transaction type, a short message transaction type and a location service transaction type therein; and a logical link control sublayer within said serving GPRS support node and said mobile station, said logical link control sublayer providing connections between said session management transaction types, said short message transaction types and said location service transaction types of said serving GPRS support node and said mobile stations, respectively, in parallel using said radio link control sublayer.

11. The telecommunications system of claim 10, further comprising a physical layer, a data link layer and an application layer within said serving GPRS support node and said mobile station, said radio link control sublayer, said connection management sublayer and said logical link control sublayer residing in said application layer.

12. The telecommunications system of claim 10, wherein said logical link control layer within said mobile station and said serving GPRS support node comprise a location service Service Access Point Identifier for establishing a location service logical link control connection between said respective location service transaction types of said mobile station and said serving GPRS support node, a session management Service Access Point Identifier for establishing a session management logical link control connection between said respective session management transaction types of said mobile station and said serving GPRS support node and a short message Service Access Point Identifier for establishing a short message logical link control connection between said respective short message transaction types of said mobile station and said serving GPRS support node in parallel.

13. The telecommunications system of claim 10, wherein said location service transaction type has a first protocol discriminator associated therewith for establishing a location service logical link control connection between said respective location service transaction types of said mobile station and said serving GPRS support node, said session management transaction type having a second protocol discriminator associated therewith for establishing a session management logical link control connection between said respective session management transaction types of said mobile station and said serving GPRS support node, said short message transaction type having a third protocol discriminator associated therewith for establishing a short message logical link control connection between said respective short message transaction types of said mobile station and said serving GPRS support node.

14. A method for allowing a telecommunications system to offer location services in parallel to existing services within a General Packet Radio Service (GPRS) system, said method comprising the steps of:

receiving, by a serving GPRS support node in wireless communication with a mobile station, a location service request for said mobile station, said serving GPRS support node and said mobile station each having a respective connection management sublayer therein, each said respective connection management sublayer having a location service transaction type and at least an additional transaction type therein, said serving GPRS support node and said mobile station each also having a respective logical link control sublayer therein connected to said respective connection management sublayer; and establishing, by said serving GPRS support node, a connection between said location services transaction types of said serving GPRS support node and said mobile station, respectively, using said logical link control sublayer, in order to perform said location service request.

15. The method of claim 14, further comprising the step of:

establishing, by said serving GPRS support node, an additional logical link control connection between said respective at least one additional transaction types of said serving GPRS support node and said mobile station, wherein services represented by said location service transaction type and said at least one additional transaction type are offered in parallel without disrupting each other.

16. The method of claim 14, wherein said at least one additional transaction type is a session management transaction type, and further comprising the step of:

establishing, by said serving GPRS support node, an additional logical link control connection between said respective session management transaction types of said serving GPRS support node and said mobile station in order to establish a data call for said mobile station in parallel to performing said location service request.

17. The method of claim 14, wherein said step of establishing said logical link control connection between said location services transaction types of said serving GPRS support node and said mobile station, respectively, further comprises the steps of:

allocating a location service Service Access Point Identifier within said logical link control layer for said location service transaction type; and establishing said logical link control connection between said location services transaction types of said serving GPRS support node and said mobile station, respectively, using said location service Service Access Point Identifier.

18. The method of claim 14, wherein said step of establishing said logical link control connection between said location services transaction types of said serving GPRS support node and said mobile station, respectively, further comprises the steps of:

associating a location service protocol discriminator with said location service transaction type; and establishing said logical link control connection between said location services transaction types of said serving GPRS support node and said mobile station, respectively, using said location service protocol discriminator.

* * * * *